(12) United States Patent
Chu et al.

(10) Patent No.: US 9,594,389 B2
(45) Date of Patent: Mar. 14, 2017

(54) DEVICE AND METHOD FOR AUTOMATICALLY COORDINATING PROTECTION DEVICE OF SMART POWER DISTRIBUTION MANAGEMENT SYSTEM

(75) Inventors: Cheol-Min Chu, Daejeon (KR); Sang-Yun Yun, Daejeon (KR); Seong-Chul Kwon, Daejeon (KR); Il-Keun Song, Daejeon (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 393 days.

(21) Appl. No.: 14/347,891

(22) PCT Filed: Sep. 30, 2011

(86) PCT No.: PCT/KR2011/007248
§ 371 (c)(1),
(2), (4) Date: Mar. 27, 2014

(87) PCT Pub. No.: WO2013/047927
PCT Pub. Date: Apr. 4, 2013

(65) Prior Publication Data
US 2014/0229029 A1    Aug. 14, 2014

(30) Foreign Application Priority Data
Sep. 29, 2011 (KR) .................. 10-2011-0099006

(51) Int. Cl.
*G05F 1/66* (2006.01)
*H02H 7/26* (2006.01)
(Continued)

(52) U.S. Cl.
CPC .............. *G05F 1/66* (2013.01); *H02H 3/006* (2013.01); *H02H 7/261* (2013.01); *H02H 7/30* (2013.01);
(Continued)

(58) Field of Classification Search
None
See application file for complete search history.

(56) References Cited

U.S. PATENT DOCUMENTS 5,612,579 A * 3/1997 Wisbey .................. B64D 41/00
  290/4 R
6,011,546 A * 1/2000 Bertram ............... H04N 21/443
  348/563
(Continued)

FOREIGN PATENT DOCUMENTS

| JP | 2001-258145 A | 9/2001 |
| KR | 10-2005-0023103 A | 3/2005 |
| KR | 10-2005-0091916 A | 9/2005 |

OTHER PUBLICATIONS

International Search Report, w/ English translation thereof, issued in International Application No. PCT/KR2011/007248 dated Sep. 19, 2012.
(Continued)

*Primary Examiner* — Tuan Dao
(74) *Attorney, Agent, or Firm* — McDermott Will & Emery LLP

(57) ABSTRACT

Provided are a device and a method for automatically coordinating a protection device of a smart power distribution management system, wherein a protection coordination correction value of the protection device is calculated via topology analysis and system analysis of a distribution system so as to apply the result to a smart power distribution management system. The device for automatically coordinating a protection device as provided comprises: generating the topology information by obtaining the status information of the distribution system; setting machines, which transmit and received data when an event occurs, to communicate for each of a plurality of protection devices based on the topology information; calculating a system power flow
(Continued)

including the power flow direction based on the topology information; and calculating a fault current which is generated upon the failure of the distribution system based on the topology information, thereby generating a protection coordination correction value.

18 Claims, 11 Drawing Sheets

(51) Int. Cl.
- *H02J 13/00* (2006.01)
- *H02H 3/00* (2006.01)
- *H02H 7/30* (2006.01)
- *H02H 1/00* (2006.01)

(52) U.S. Cl.
CPC ........ *H02J 13/0006* (2013.01); *H02H 1/0092* (2013.01); *Y02E 60/725* (2013.01); *Y04S 10/20* (2013.01)

(56) References Cited

U.S. PATENT DOCUMENTS

| | | | |
|---|---|---|---|
| 6,347,027 B1* | 2/2002 | Nelson | H02H 1/0092 361/64 |
| 9,112,422 B1* | 8/2015 | Vinciarelli | H02M 3/33507 |
| 2009/0207543 A1* | 8/2009 | Boniface | H02H 3/16 361/86 |
| 2011/0282508 A1* | 11/2011 | Goutard | H04L 63/20 700/293 |

OTHER PUBLICATIONS

Hyung, "Multi Agent based Distributed Protection and Restoration Method in Distribution Automation Syatems," 133 pages; with English translation thereof; (2010).

* cited by examiner

| FIELD | L(Left) | R(Right) | Direction | Current | | Load |
|---|---|---|---|---|---|---|
| | | | | Max. | Min. | |
| G1 | | R1, G2 | 1 | Max-1 | Min-1 | Load-1 |
| R1 | G1 | G2, G3, R2 | 1 | Max-2 | Min-2 | Load-2 |
| G2 | G1, R1 | G3, G4, R2 | 1 | Max-3 | Min-3 | Load-3 |
| G3 | R1, G2 | G4, G5, R2, R6 | 1 | Max-4 | Min-4 | Load-4 |
| G4 | G2, G3 | G5, R2 | 1 | Max-5 | Min-5 | Load-5 |
| G5 | G3, G4 | | 1 | Max-6 | Min-6 | Load-6 |
| R2 | G2, G3 | G6, G4 | 1 | Max-7 | Min-7 | Load-7 |
| G6 | R2, G3 | | 1 | Max-8 | Min-8 | Load-8 |

FIG. 5

DEVICE AND METHOD FOR AUTOMATICALLY COORDINATING PROTECTION DEVICE OF SMART POWER DISTRIBUTION MANAGEMENT SYSTEM

RELATED APPLICATIONS

This application is the U.S. National Phase under 35 U.S.C. §371 of International Application No. PCT/KR2011/007248, filed on Sep. 30, 2011, which in turn claims the benefit of Korean Application No. 10-2011-0099006, filed on Sep. 29, 2011, the disclosures of which Applications are incorporated by reference herein.

TECHNICAL FIELD

The present invention relates, in general, to an apparatus and method for automatically coordinating the protection devices of a smart power distribution management system and, more particularly, to an apparatus and method for automatically coordinating the protection devices of a smart power distribution management system, which perform protection coordination correction for each protection device so as to solve problems such as faults, overload, imbalance, and changes in topology and system status that may occur in the distribution system of the smart power distribution management system, thus improving the operation efficiency of the distribution system.

This application claims the benefit of Korean Patent Application No. 10-2011-0099006, filed on Sep. 29, 2011, which is hereby incorporated by reference in its entirety into this application.

BACKGROUND ART

A smart power distribution management system performs functions such as measurement, protection, monitoring, and control on a distribution system. That is, a smart power distribution management system is a system composed of software and hardware so as to monitor the current status of the distribution system, exactly detect the current status, and present solutions to various problems that may occur in the distribution system (faults, overload, imbalance, etc.) to operators in the form of system control and management plans.

Such a smart power distribution management system is connected to a large number of distributed power sources, and performs interconnection operation on multiple substations via the regular loop operation or the like of the distribution system. The smart power distribution management system performs protection coordination of various lines and distributed power protection devices so as to improve the reliability of management of the distribution system. For this, as shown in FIG. 1, the smart power distribution management system includes a plurality of measuring devices 10 for measuring the system status of a distribution system, dualized measurement data servers 20 for managing the system status measured by the plurality of measuring devices, a main server 30 for managing and applying protection coordination information (policies), a database (DB) server 40 for storing pieces of information related to the management of the distribution system, user terminals 50 for calculating correction values for protection coordination information and correcting previous protection coordination information, and a plurality of protection devices 60. The smart power distribution management system calculates a periodic or an event-driven management plan and transmits the calculated plan to the corresponding part. In this case, software elements operated to allow the main server 30 to periodically calculate system status are periodically and sequentially executed. In order to cope with an event situation, event-mode software executes operations to cope with such an event situation.

When a change in the topology or system status of the distribution system occurs, the smart power distribution management system performs correction of protection coordination on protection devices. That is, the smart power distribution management system calculates differences between coordination times of protection devices and correction values for the operation of protection devices in a radially configured distribution system, and then manually performs the correction of protection coordination.

In a conventional smart power distribution management system, when protection coordination correction for a protection device is required, a manager calculates protection coordination correction values for a protection device via documents and training simulation related to a coordination plan and then manually performs protection coordination correction. That is, the conventional smart power distribution management system uses a method in which a manager manually calculates a fault current, fault analysis, pick-up values, a delay time between protection coordination devices, etc. by using a related technical program, and applies such calculated information to the management system.

However, the conventional protection coordination correction method for the distribution system is problematic in that it is difficult to sense a change in topology or in the status of protection coordination of the distribution system, and it is also difficult to immediately cope with such a change even if the change has been sensed. That is, the conventional protection coordination correction method for the distribution system is problematic in that, after the system situation has been examined by documents and training simulators, protection coordination correction is performed, and thus it is difficult to perform protection coordination correction caused by a change in system status occurring during examination.

Recently, a distribution system is operated in the shape of a loop so that a plurality of distributed power sources and a plurality of protection devices are connected to the distribution system, and operation efficiency is improved based on a plurality of connection nodes of the distribution system. Therefore, the smart power distribution management system requires protection coordination for a distribution system which includes a plurality of distributed power sources and protection devices and which is operated in the shape of a loop.

However, there is a problem in that, when the conventional protection coordination correction method is used, the number of protection devices capable of having a protection coordination delay per line is limited, and a correction method is also limited.

DISCLOSURE

Technical Problem

The present invention has been made keeping in mind the above problems occurring in the prior art, and an object of the present invention is to provide an apparatus and method for automatically coordinating the protection devices of a smart power distribution management system, which calculate protection coordination correction values for a protection device via the topology analysis and system analysis (that is, power flow analysis and fault analysis) of a distribution system, and apply the protection coordination correction values to the smart power distribution management system. That is, the present invention is intended to provide an apparatus and method for automatically coordinating the protection devices of the smart power distribution management system, which are configured to actively cope with an event occurrence situation in the occurrence of an event in the distribution system, wherein correction values for immediate coordination of the protection device are calculated and applied to a situation in which the system has changed, thus coping with a management environment in which a system situation is continuously changing.

Technical Solution

In order to accomplish the above object, an apparatus for automatically coordinating protection devices of a smart power distribution management system according to an embodiment of the present invention includes, in the system including a plurality of measuring devices, a plurality of distributed power sources, a plurality of protection devices, a plurality of automatic switches, and a main server, a status information acquisition unit for acquiring status information of a distribution system from the plurality of measuring devices; a topology generation unit for generating topological information of the distribution system based on the acquired status information of the distribution system; a communication setting unit for setting one or more communication target devices for transmitting/receiving data when an event occurs in the distribution system, for each of the plurality of protection devices based on the generated topological information; a power flow calculation unit for calculating a system power flow including a power flow direction of the distribution system, based on the generated topological information; a fault current calculation unit for calculating a fault current caused when a fault occurs in the distribution system, based on the generated topological information; and a correction value generation unit for generating protection coordination correction values including the set communication target devices, the calculated system power flow, and the calculated fault current, for each of the plurality of protection devices.

The status information acquisition unit may acquire status information of the distribution system, including system configuration and communication-executable device information of the distribution system.

The status information acquisition unit acquires communication-executable device information from pre-stored device information of the plurality of switches.

The communication setting unit may separate the plurality of protection devices into corresponding areas based on the topological information, and set left and right communication target devices for each of the plurality of protection devices.

The power flow calculation unit may set a reference bus of the distribution system that is an analytic unit from the topological information, set a power flow direction of the set reference bus to a single direction, and then calculate a system power flow.

The fault current calculation unit may calculate a fault current including at least one of a fault current caused by a 3-phase short-circuit, a fault current caused by a line-to-line short-circuit, a fault current caused by a double line-ground fault, and a fault current caused by a single line-ground fault.

The correction value generation unit may generate protection coordination correction values including left and right communication target devices, a power flow direction, and a fault current, for each of the plurality of protection devices.

The apparatus may further include a control unit for performing control such that preset protection coordination information is corrected using the generated protection coordination correction values, and the corrected protection coordination information is transmitted to the plurality of protection devices through the main server.

The control unit may correct directional relay information using the system power flow, and correct a minimum operating current of each of the plurality of protection devices using the fault current.

The apparatus may further include a storage unit for storing protection coordination information of the distribution system, and storing device information including structures of the plurality of measuring devices, the plurality of distributed power sources, the plurality of protection devices, and the plurality of automatic switches.

In order to accomplish the above object, a method for automatically coordinating protection devices of a smart power distribution management system according to an embodiment of the present invention includes, in the system including a plurality of measuring devices, a plurality of distributed power sources, a plurality of protection devices, a plurality of automatic switches, and a main server, acquiring status information of a distribution system from the plurality of measuring devices; generating topological information of the distribution system based on the acquired status information of the distribution system; setting one or more communication target devices for transmitting/receiving data when an event occurs in the distribution system, for each of the plurality of protection devices based on the generated topological information; calculating a system power flow including a power flow direction of the distribution system, based on the generated topological information; calculating a fault current caused when a fault occurs in the distribution system, based on the generated topological information; and generating protection coordination correction values including the set communication target devices, the calculated system power flow, and the calculated fault current, for each of the plurality of protection devices.

Acquiring the status information of the distribution system may be configured to acquire status information of the distribution system, including system configuration and communication-executable device information of the distribution system.

Acquiring the status information of the distribution system may be configured to acquire communication-executable device information from pre-stored device information of the plurality of switches.

Setting the communication target devices may include dividing the distribution system into a plurality of areas based on the topological information; separating, based on the plurality of areas, the plurality of protection devices into corresponding areas; and setting left and right communication target devices for each of the plurality of protection devices separated into the corresponding areas.

Calculating the system power flow may include setting a reference bus of the distribution system that is an analytic unit from the topological information; and setting a power flow direction of the set reference bus to a single direction, and then calculating a system power flow.

Calculating the fault current may be configured to calculate a fault current including at least one of a fault current caused by a 3-phase short-circuit, a fault current caused by a line-to-line short-circuit, a fault current caused by a double line-ground fault, and a fault current caused by a single line-ground fault.

Generating the protection coordination correction values may be configured to generate protection coordination correction values including left and right communication target devices, a power flow direction, and a fault current, for each of the plurality of protection devices.

The method may further include correcting preset protection coordination information using the generated protection coordination correction values.

Correcting the protection coordination information may include correcting directional relay information using the calculated system power flow; and correcting a minimum operating current of each of the plurality of protection devices using the calculated fault current.

The method may further include transmitting protection coordination information corrected using the generated protection coordination correction values to the plurality of protection devices through the main server.

Advantageous Effects

In accordance with the present invention, the apparatus and method for automatically coordinating the protection devices of a smart power distribution management system are advantageous in that protection coordination correction values are generated based on topology generated using the distribution system status information of devices included in a distribution system, and protection coordination information is corrected, thus promptly coping with a distribution system management environment which is continuously changing, improving operation efficiency for the distribution system, and enabling a distribution system protection function to be desirably performed.

Further, the apparatus and method for automatically coordinating the protection devices of the smart power distribution management system are advantageous in that protection coordination information for the distribution system is corrected depending on a distribution system management environment which is continuously changing, thus preventing the distribution system from interrupting the supply of power and safely operating electric equipment.

DESCRIPTION OF DRAWINGS

FIG. 5 is a diagram showing the correction value generation unit of FIG. 3;

BEST MODE

Figure 1:
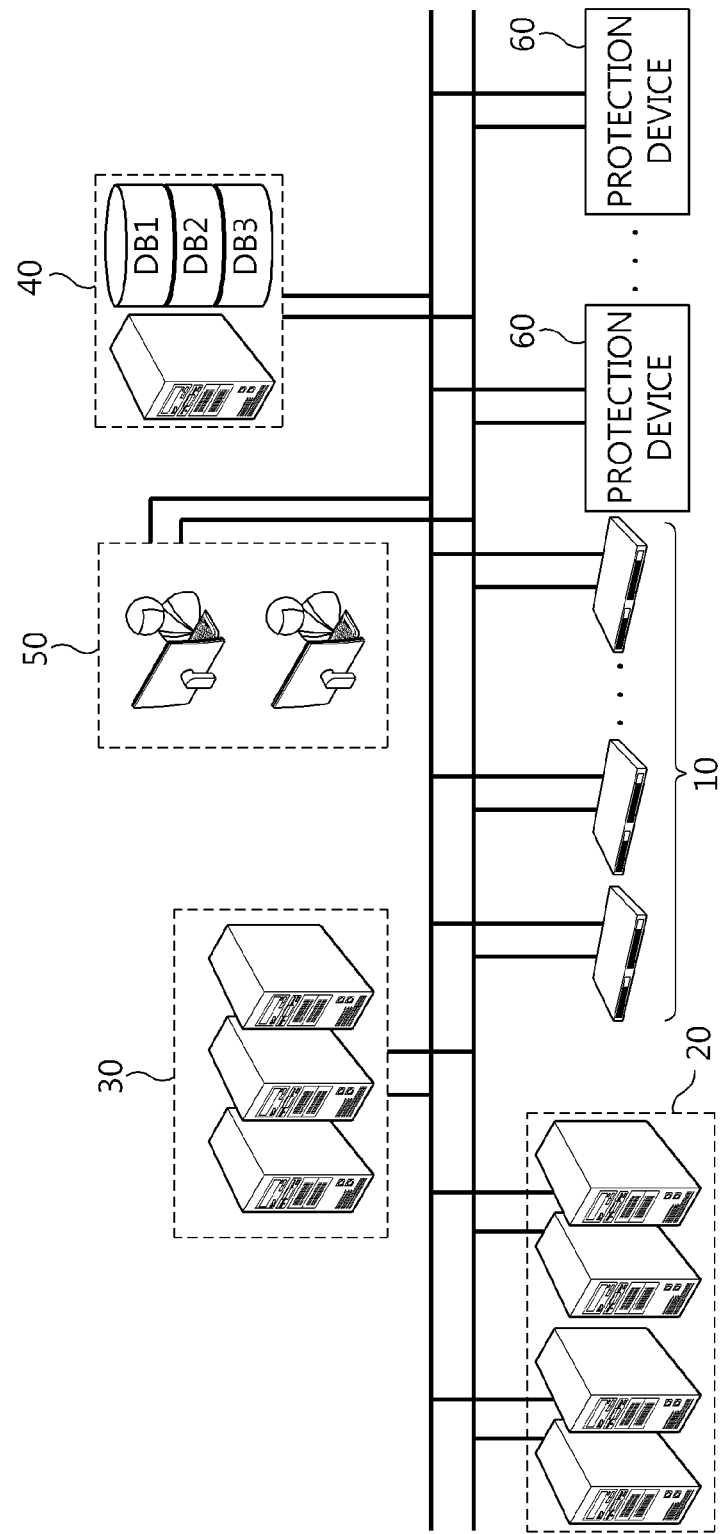
FIG. 1 is a diagram showing a conventional smart power distribution management system.

Preferred embodiments of the present invention will be described with reference to the accompanying drawings in order to describe the present invention in detail so that those having ordinary knowledge in the technical field to which the present invention pertains can easily practice the technical spirit of the present invention. It should be noted that same reference numerals are used to designate the same elements even if they are depicted in different drawings, upon attaching reference numerals to the elements of the drawings. In the following description of the present invention, detailed descriptions of related known constructions or functions which are deemed to make the gist of the present invention obscure will be omitted.

Figure 2:
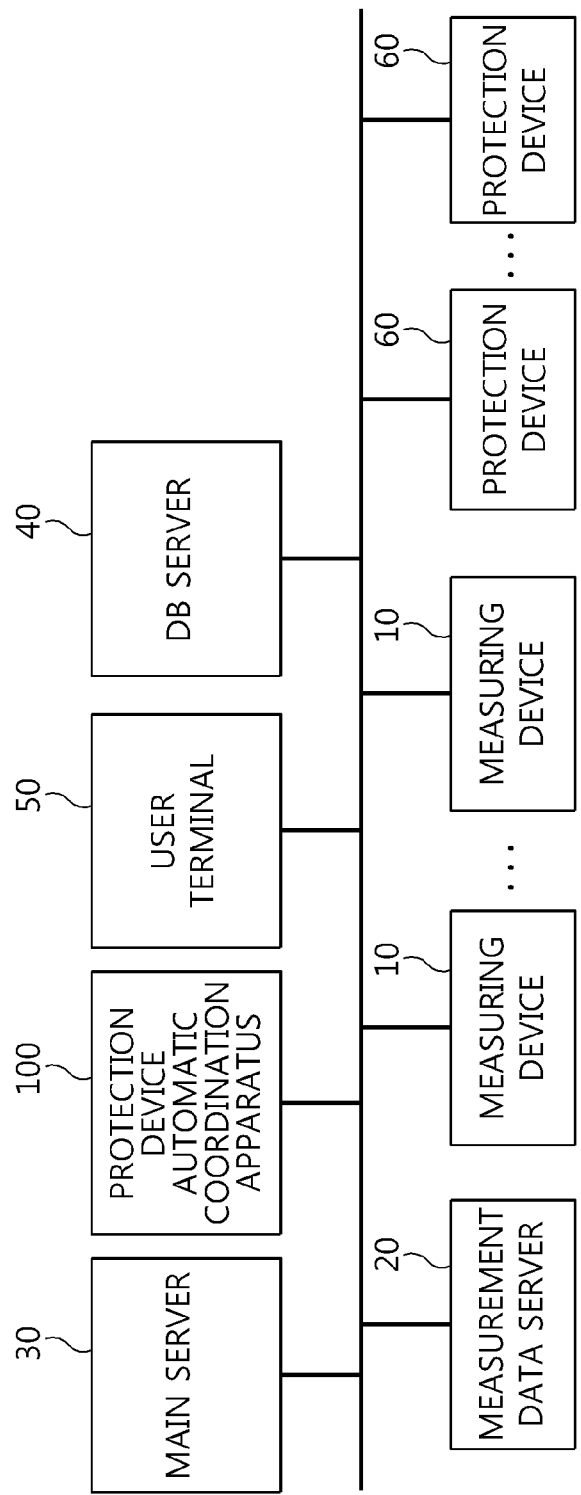
FIG. 2 is a block diagram showing a smart power distribution management system according to an embodiment of the present invention.

Hereinafter, a smart power distribution management system according to an embodiment of the present invention will be described in detail with reference to the attached drawings. FIG. 2 is a block diagram showing a smart power distribution management system according to an embodiment of the present invention.

As shown in FIG. 2, the smart power distribution management system according to an embodiment of the present invention includes a plurality of measuring devices 10, a measurement data server 20, a main server 30, a database (DB) server 40, a user terminal 50, a plurality of protection devices 60, and an apparatus 100 for automatically coordinating the protection devices.

The plurality of measuring devices 10 are distributed and installed in a distribution system, and are configured to measure the status information of the distribution system and transmit the status information to the measurement data server 20, the main server 30, and the protection device automatic coordination apparatus 100. In this case, the plurality of measuring devices 10 measure measurement data enabling the configuration of the system (radial configuration, loop configuration, etc.) to be checked, and transmit the measurement data.

The measurement data server 20 stores the measurement data received from the plurality of measuring devices 10. In this case, the measurement data server 20 is configured as a dualized structure so that, if one measurement data server 20 fails, the distribution system is normally driven.

The main server 30 administers the management of the distribution system depending on preset protection coordination information. That is, the main server 30 transmits the protection coordination information to the plurality of protection devices 60 and then enables protection coordination between the protection devices to be performed. The main server 30 receives protection coordination information from the protection device automatic coordination apparatus 100 when the status of the distribution system is changed. In this case, the main server 30 receives protection coordination information into which protection coordination correction values are incorporated. The main server 30 transmits the received protection coordination information to the plurality of protection devices 60, so that protection coordination is performed in consideration of the changed status of the distribution system.

The main server 30 transmits the management information of the distribution system to the user terminal 50. The main server 30 transmits management information including the measurement data, the protection coordination information, etc. to the user terminal 50 so that the management state of the distribution system may be checked by a user.

The DB server 40 stores and manages information about the management of the distribution system.

The user terminal 50 displays the management information of the distribution system received from the main server 30. In this case, the user terminal 50 displays the management state of the distribution system via a human-machine interface (HMI)/man-machine interface (MMI).

The protection device 60 is a device installed to improve the stability of the management of the distribution system as distributed power sources such as a circuit breaker or a recloser are added to the distribution system. Here, the protection device 60 may be easily known by those skilled in the art, and thus a detailed description thereof will be omitted.

The protection device automatic coordination apparatus 100 will be described in detail below with reference to the attached drawings.

Figure 3:
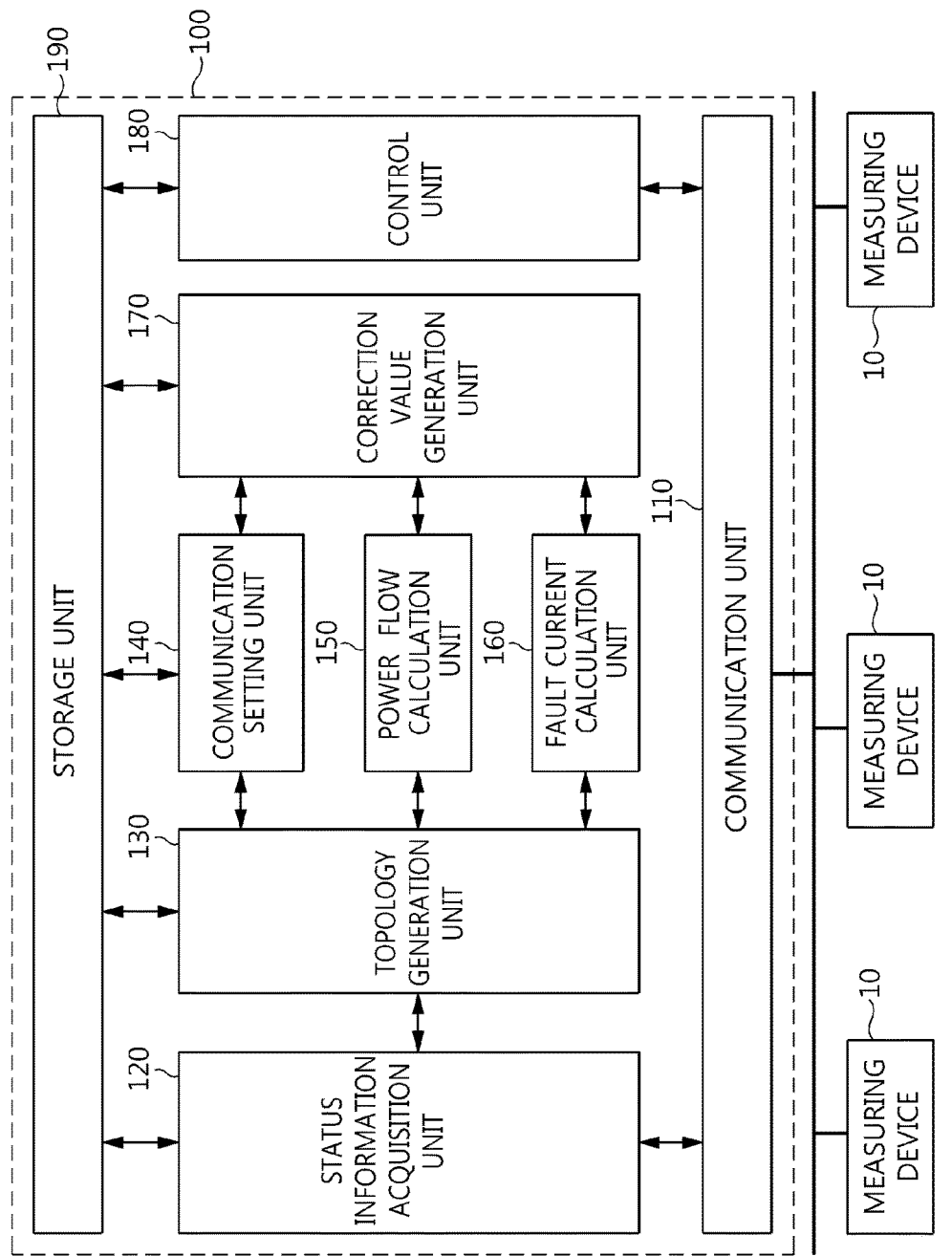
FIG. 3 is a block diagram showing an apparatus for automatically coordinating the protection devices of the smart power distribution management system according to an embodiment of the present invention.
Figure 4:
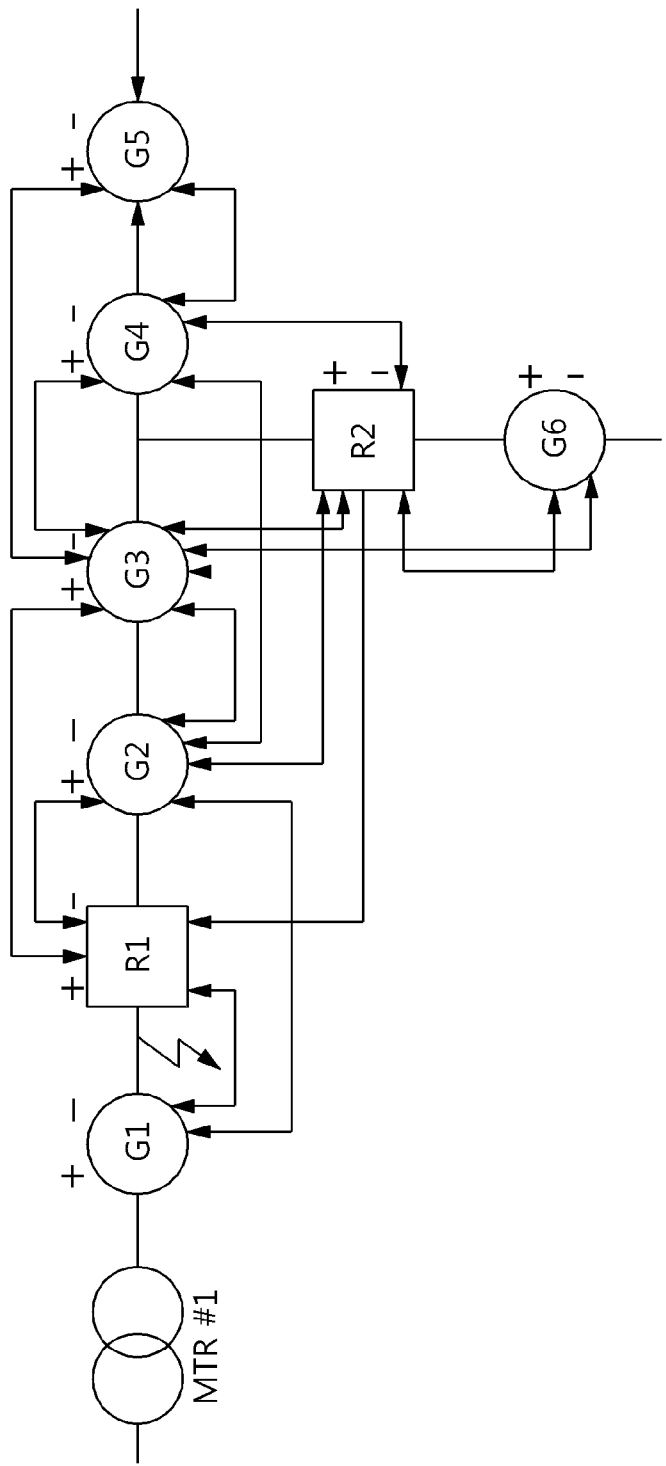
FIG. 4 is a diagram showing the communication setting unit of FIG. 3.

Below, an apparatus for automatically coordinating the protection devices of the smart power distribution management system according to an embodiment of the present invention will be described in detail with reference to the attached drawings. FIG. 3 is a block diagram showing an apparatus for automatically coordinating the protection devices of the smart power distribution management system according to an embodiment of the present invention. FIG. 4 is a diagram showing the communication setting unit of FIG. 3, and FIG. 5 is a diagram showing the correction value generation unit of FIG. 3.

As shown in FIG. 3, the apparatus 100 for automatically coordinating the protection devices of the smart power distribution management system includes a communication unit 110, a status information acquisition unit 120, a topology generation unit 130, a communication setting unit 140, a power flow calculation unit 150, a fault current calculation unit 160, a correction value generation unit 170, a control unit 180, and a storage unit 190. Here, when the main server 30 performs correction of protection coordination, the storage unit 190 may be excluded from the above configuration.

The communication unit 110 transmits/receives data to/from the main server 30, the DB server 40, the measurement data server 20, and the plurality of measuring devices 10, which are connected over a network. That is, the communication unit 110 receives the status information of the distribution system from the plurality of measuring devices 10 and transmits it to the status information acquisition unit 120. The communication unit 110 receives distribution system information required to acquire the status information of the distribution system from the DB server 40. That is, when distribution system information (for example, protection coordination information, the device information of the plurality of measuring devices 10, the device information of the plurality of distributed power sources, the device information of the plurality of protection devices 60, and the device information of a plurality of automatic switches) is not stored in the storage unit 190, the communication unit 110 receives distribution system information from the DB server 40. The communication unit 110 transmits protection coordination information, into which protection coordination correction values are incorporated, to the main server 30 under the control of the control unit 180. In this case, when the main server 30 processes protection coordination correction, the communication unit 110 may also transmit protection coordination correction values to the main server 30.

The status information acquisition unit 120 acquires the status information of the distribution system. That is, the status information acquisition unit 120 acquires the status information of the distribution system from the plurality of measuring devices 10 through the communication unit 110. In this case, the status information acquisition unit 120 acquires the distribution system status information including the system configuration and communication-executable device information of the distribution system. In this case, the status information acquisition unit 120 acquires communication-executable device information from the pre-stored device information of the plurality of switches. That is, the status information acquisition unit 120 detects the device information of the plurality of switches from pieces of distribution system information stored in the storage unit 190. For example, the status information acquisition unit 120 acquires communication-executable device information using switch structure information (CBSW_TYPE in CBSW_STA of an Anticoincidence Detector (ACD) structure) and switch measurement information (CBSW_LOCKV in CBSW_STA of ACD structure) from the detected device information of the plurality of switches. In this case, the status information acquisition unit 120 may also acquire communication-executable device information using the device information of the plurality of switches received from the DB server 40 through the communication unit 110.

The topology generation unit 130 generates topological information of the distribution system based on the status information of the distribution system. That is, the topology generation unit 130 generates the topological information of the distribution system using system configuration and communication-executable device information acquired by the status information acquisition unit 120.

The communication setting unit 140 sets a pair of protection devices (pair of protection coordination equipment) between which communication is to be performed in the occurrence of an event so as to calculate protection coordination correction values. The communication setting unit 140 sets devices between which communication is to be performed because, when an event occurs in any fault section, functions to be performed based on event information are exchanged as signals and signals to be exchanged depending on the characteristics of communication protocols are broadcasted. For this, the communication setting unit 140 sets one or more communication target devices, which will transmit/receive data when an event occurs in the distribution system, for each of the plurality of protection devices 60 based on the generated topological information. In this case, the communication setting unit 140 separates the plurality of protection devices 60 into corresponding areas based on the topological information, and sets a left communication target device and a right communication target device for each of the protection devices 60. For example, as shown in FIG. 4, a case where the distribution system includes a plurality of automatic switches G1 to G6 and a plurality of protection devices 60 R1 and R2 is described as an example. The communication setting unit 140 sets the automatic switch G1 to a left communication target device of the protection device R1. The communication setting unit 140 sets the automatic switch G2 and the protection device R2 to right communication target devices of R1.

The power flow calculation unit 150 calculates the power flow direction of the distribution system so as to calculate protection coordination correction values. That is, the power flow calculation unit 150 calculates a system power flow including the power flow direction of the distribution system based on the generated topological information. For this, the power flow calculation unit 150 computes a reference bus for a distribution system which is an analytic unit to correct directional relay information included in the protection coordination information. The power flow calculation unit 150 performs an operation of setting the power flow direction of the reference bus to a single direction. In this case, the power flow calculation unit 150 calculates only the power flow of the corresponding distribution system using a divisional power flow calculation method as the results of operation.

The fault current calculation unit 160 calculates a fault current caused when a fault occurs in the distribution system, based on the generated topological information. That is, the fault current calculation unit 160 calculates a fault current indicative of the results of fault analysis of the distribution system required to compute the minimum operating current of the protection devices 60. In this case, the fault current calculation unit 160 calculates a fault current including at least one of a fault current caused by a 3-phase short-circuit, a fault current caused by a line-to-line short-circuit, a fault current caused by a double-line ground fault, and a fault current caused by a single line-ground fault.

The correction value generation unit 170 generates protection coordination correction values required to correct protection coordination information. That is, the correction value generation unit 170 generates protection coordination correction values including communication target devices set for each of the plurality of protection devices 60, the calculated system power flow, and the fault current. In this case, as shown in FIG. 5, the correction value generation unit 170 generates the protection coordination correction values in the form of a table (that is, packaged data) including protection coordination correction values having left and right communication target devices set by the communication setting unit 140, the power flow directions calculated by the power flow calculation unit 150, and fault currents calculated by the fault current calculation unit 160.

The control unit 180 corrects preset protection coordination information using the generated protection coordination correction values. That is, the control unit 180 corrects directional relay information using the system power flow of the protection coordination correction values. The control unit 180 corrects the minimum operating currents of the respective protection devices 60 using the fault currents of the protection coordination correction values.

The control unit 180 transfers the corrected protection coordination information to each of the plurality of protection devices 60. That is, the control unit 180 transmits the corrected protection coordination information to the main server 30. The main server 30 transfers the received protection coordination information to the DB server 40 and allows the information to be stored in the DB server. The main server 30 transmits the received protection coordination information to the plurality of protection devices 60.

The control unit 180 is configured to, when the main server 30 performs protection coordination correction, transmit protection coordination correction values to the main server 30. That is, the control unit 180 transmits the protection coordination correction values generated by the correction value generation unit 170 to the main server 30 through the communication unit 110. The main server 30 corrects protection coordination information stored in the DB server 40 using the received protection coordination correction values. That is, the main server 30 detects the protection coordination information stored in the DB server 40. The main server 30 corrects the directional relay information of the detected protection coordination information using the system power flow of the received protection coordination correction values. The main server 30 corrects the respective minimum operating currents of the plurality of protection devices 60 in the detected protection coordination information using the fault currents of the received protection coordination correction values.

The storage unit 190 stores the protection coordination information of the distribution system. That is, the storage unit 190 stores protection coordination information including the directional relay information, the minimum operating currents of the respective protection devices 60, and communication target device information.

The storage unit 190 stores the device information of the devices included in the distribution system. That is, the storage unit 190 stores device information including the structures of the plurality of measuring devices 10, the plurality of distributed power sources, the plurality of protection devices 60, and the plurality of automatic switches included in the distribution system.

Figure 6:
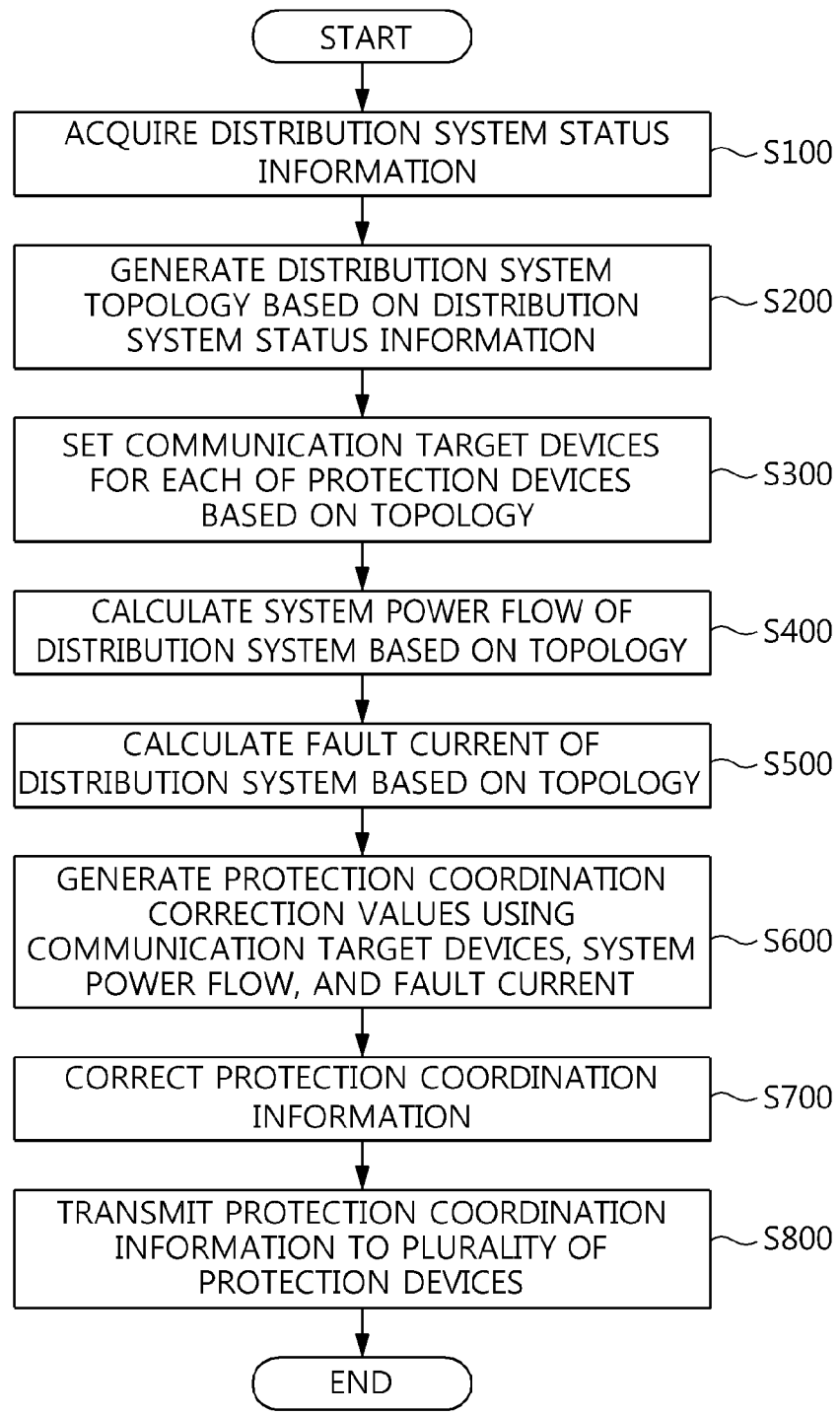
FIG. 6 is a flowchart showing a method for automatically coordinating the protection devices of the smart power distribution management system according to an embodiment of the present invention.
Figure 7:
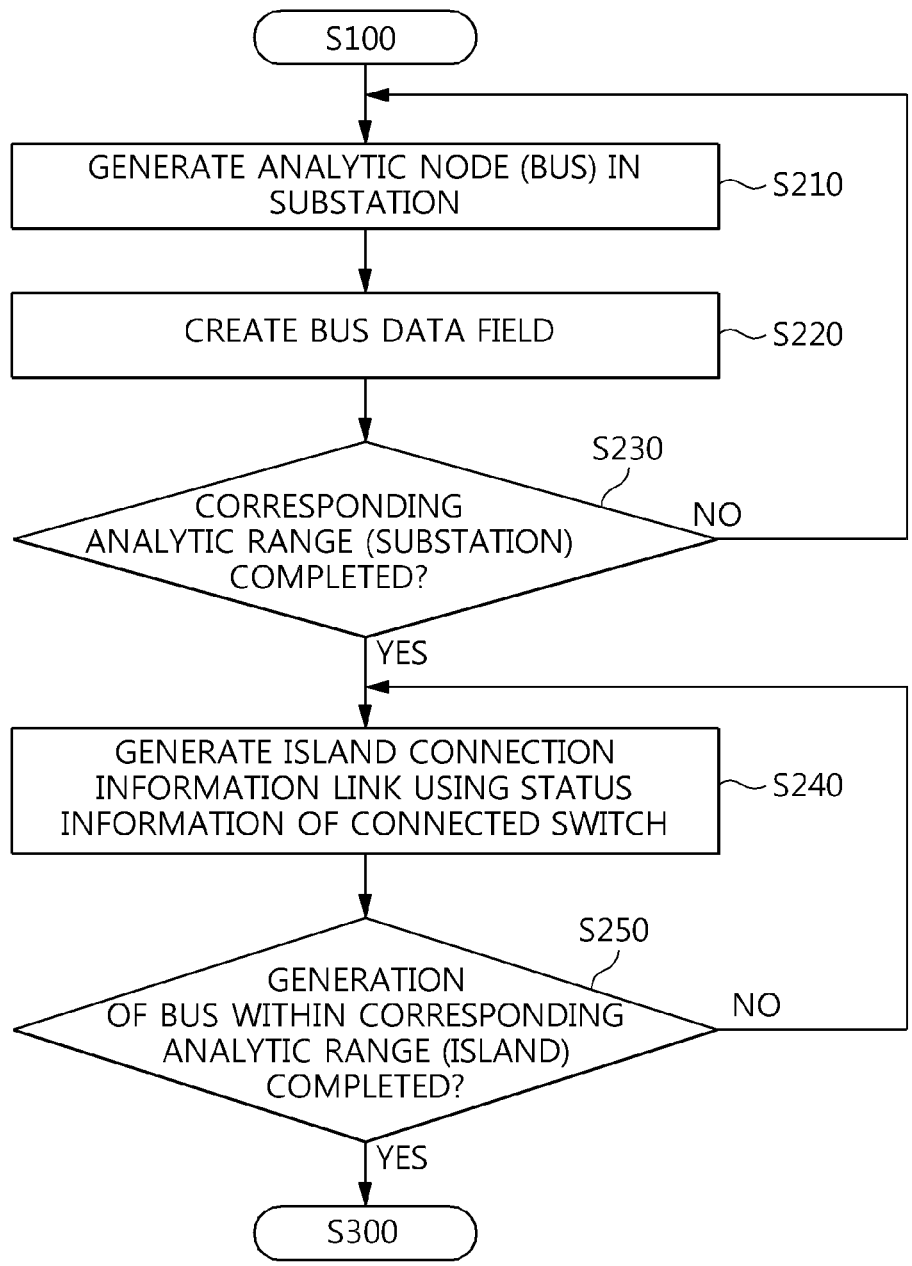
FIG. 7 is a flowchart showing the topology generation step of FIG. 6.
Figure 8:
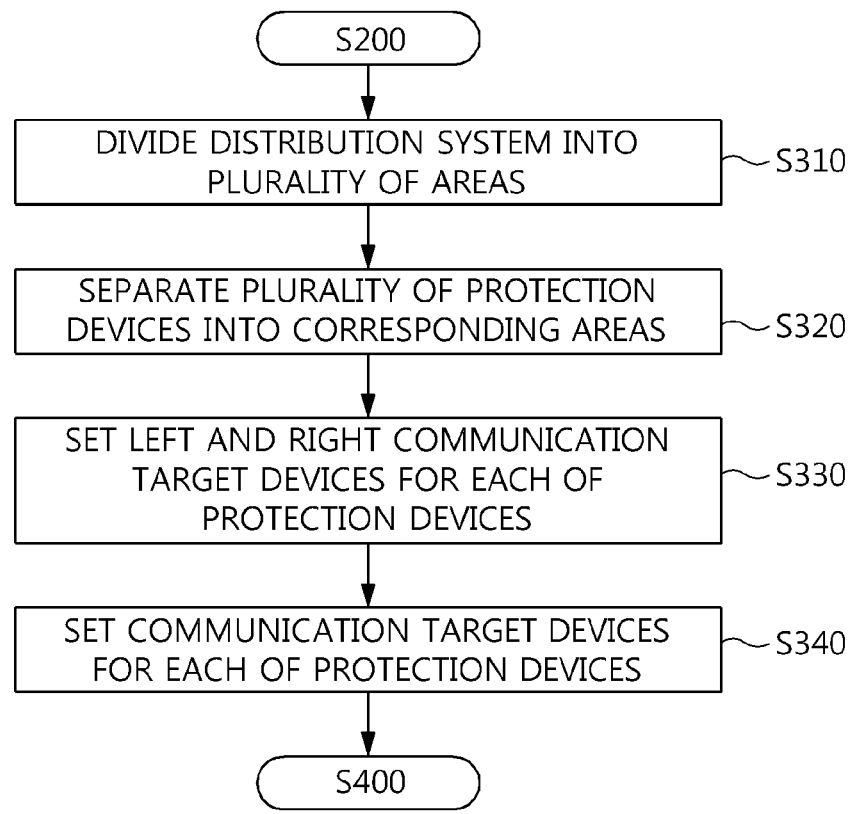
FIG. 8 is a flowchart showing the communication target device setting step of FIG. 6.
Figure 9:
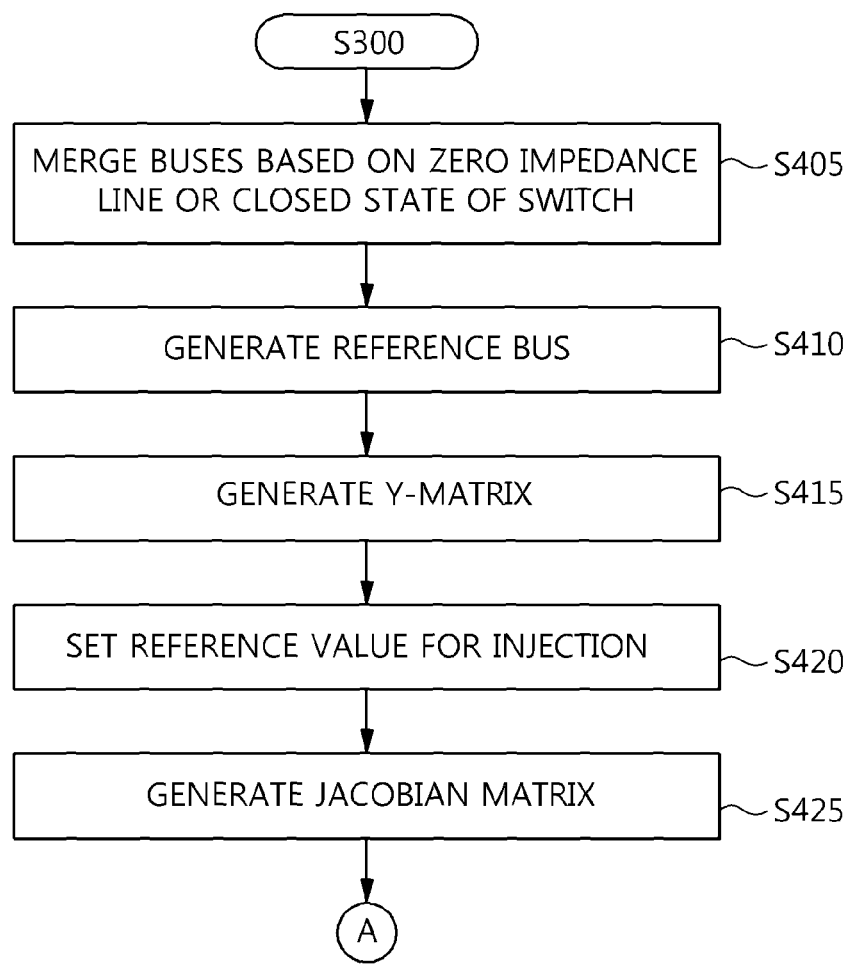
FIGS. 9 and 10 are flowcharts showing the system power flow calculation step of FIG. 6.
Figure 10:
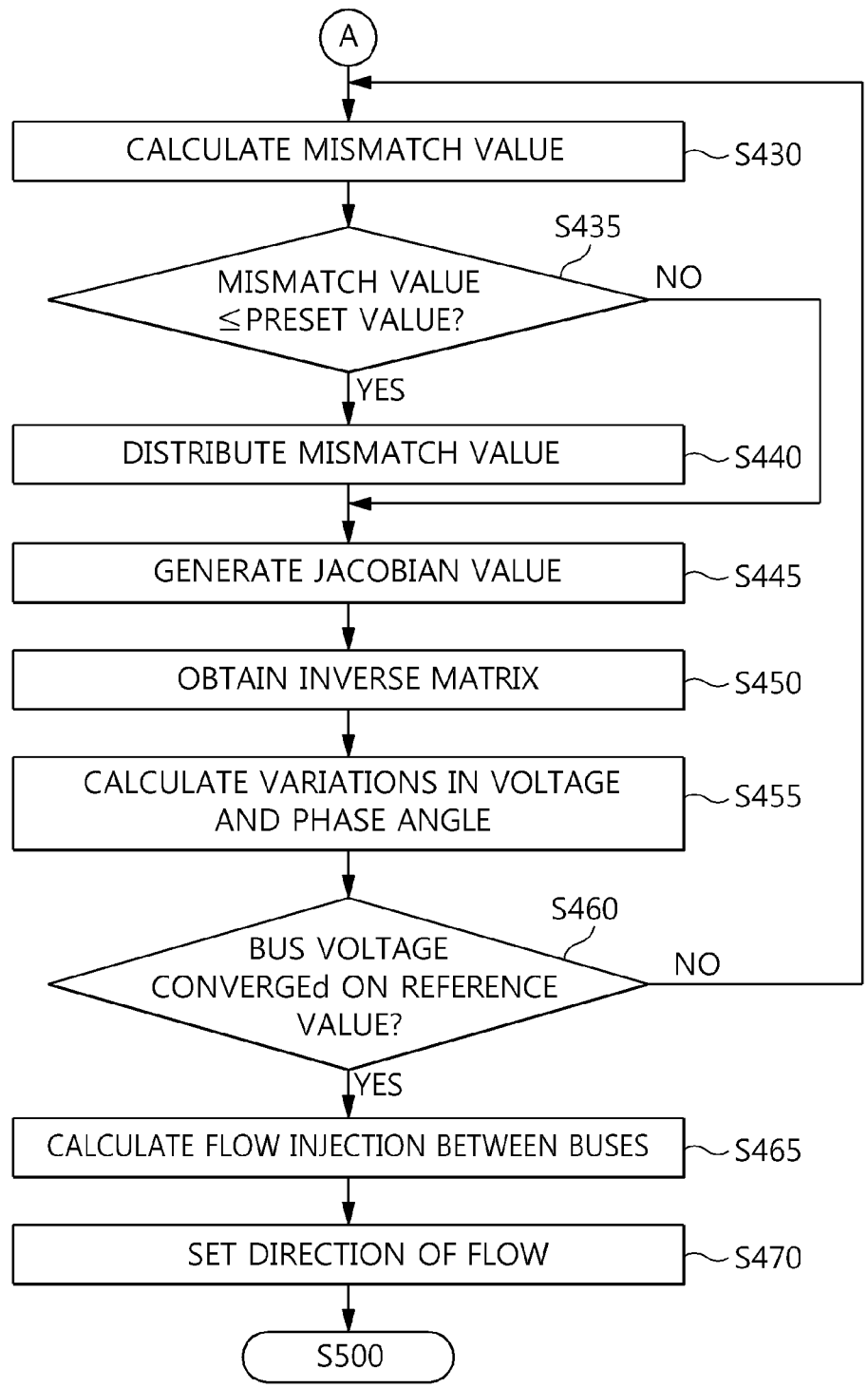
Figure 11:
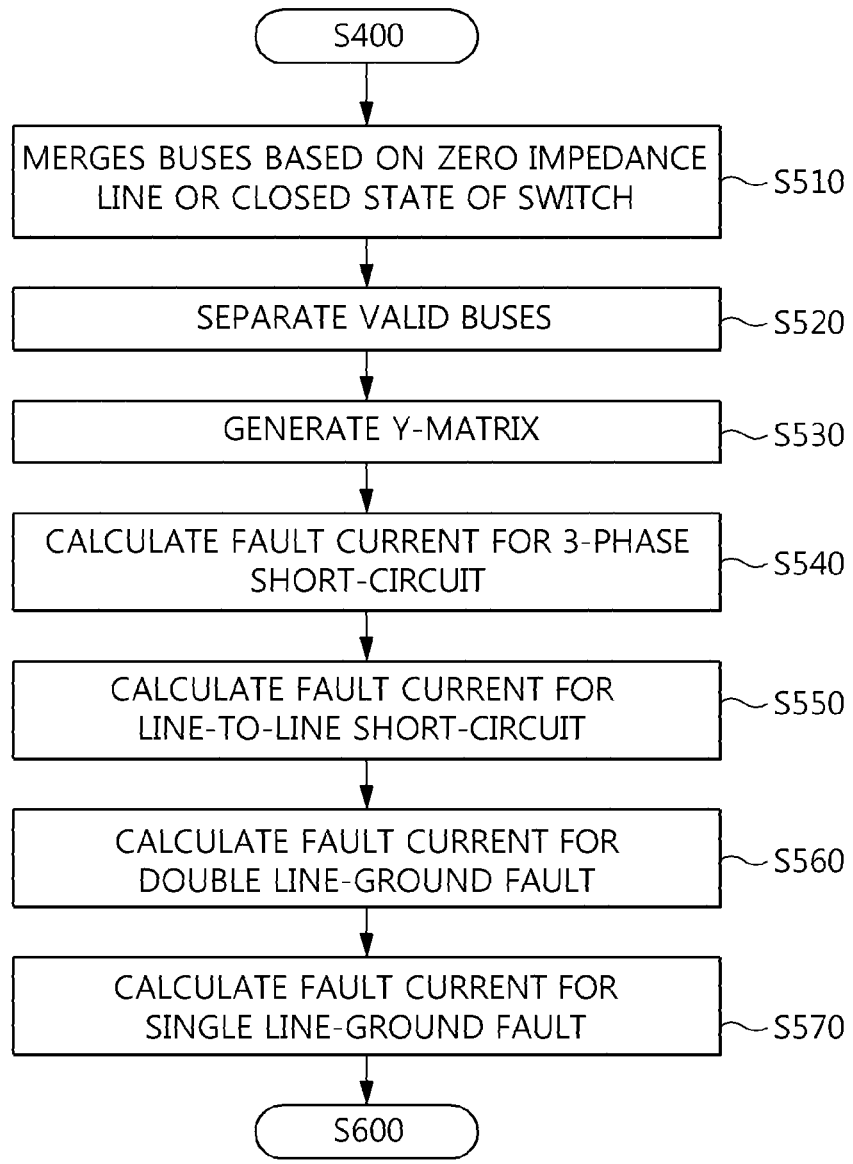
FIG. 11 is a flowchart showing the fault current calculation step of FIG. 6.

Below, a method for automatically coordinating the protection devices of the smart power distribution management system according to an embodiment of the present invention will be described in detail with reference to the attached drawings. FIG. 6 is a flowchart showing a method for automatically coordinating the protection devices of the smart power distribution management system according to an embodiment of the present invention. FIG. 7 is a flowchart showing the topology generation step of FIG. 6, FIG. 8 is a flowchart showing the communication target device setting step of FIG. 6, FIGS. 9 and 10 are flowcharts showing the system power flow calculation step of FIG. 6, and FIG. 11 is a flowchart showing the fault current calculation step of FIG. 6.

First, the protection device automatic coordination apparatus 100 acquires the status information of a distribution system at step S100. That is, the protection device automatic coordination apparatus 100 acquires the status information of the distribution system from the plurality of measuring devices 10 in the smart power distribution management system.

The protection device automatic coordination apparatus 100 generates the topology of the distribution system based on the acquired status information of the distribution system at step S200. The protection device automatic coordination apparatus 100 generates the topological information of the distribution system based on the acquired status information of the distribution system. The protection device automatic coordination apparatus 100 acquires distribution system status information including the system configuration and communication-executable device information of the distribution system. In this case, the protection device automatic coordination apparatus 100 acquires communication-executable device information from the pre-stored device information of the plurality of switches. Below, the step of generating the topology of the distribution system will be described in more detail with reference to FIG. 7.

The protection device automatic coordination apparatus 100 generates analytic nodes (that is, buses) in a substation at step S210, and creates a bus data field at step S220. In this case, the protection device automatic coordination apparatus 100 forms a link between the substation and an electrical node, and forms a link between a branch and an injection, and thus creates the bus data field. If the creation of the bus data field for the corresponding analytic range (substation) has been completed (Yes at step S230), the protection device automatic coordination apparatus 100 generates an island connection information link using the status information of a connected switch. If the generation of the bus of the corresponding analytic range (that is, the island) has been completed (Yes at step S250), the protection device automatic coordination apparatus 100 sets communication target devices.

The protection device automatic coordination apparatus 100 sets communication target devices for each of the plurality of protection devices 60 based on the generated topology at step S300. That is, the protection device automatic coordination apparatus 100 sets one or more communication target devices, which will transmit/receive data when an event occurs in the distribution system, for each of the plurality of protection devices 60 based on the generated topological information. Here, the step of setting communication target devices will be described in more detail below with reference to FIG. 8. The protection device automatic coordination apparatus 100 divides the distribution system into a plurality of areas based on the generated topological information at step S310, and separates the plurality of protection devices 60 included in the distribution system into the corresponding areas at step S320. The protection device automatic coordination apparatus 100 sets left and right communication target devices for each of the protection devices 60 separated into the corresponding areas at step S330, and then sets communication target devices for each of the plurality of protection devices 60 at step S340.

The protection device automatic coordination apparatus 100 calculates the system power flow of the distribution system based on the generated topology at step S400. In this case, the protection device automatic coordination apparatus 100 sets a reference bus of the distribution system which is an analytic unit in the topological information. The protection device automatic coordination apparatus 100 sets the power flow direction of the set reference bus to a single direction and then calculates a system power flow. Here, the step of calculating the system power flow will be described in more detail below with reference to FIGS. 9 and 10. The protection device automatic coordination apparatus 100 merges buses based on a zero impedance line or the closed state of a switch at step S405 and generates a reference bus at step S410. The protection device automatic coordination apparatus 100 generates a Y-matrix at step S415, and thereafter sets a reference value for injection at step S420. The protection device automatic coordination apparatus 100 generates a Jacobian matrix at step S425, and then calculates a mismatch value at step S430. If the calculated mismatch value is equal to or less than a preset value (Yes at step S435), the protection device automatic coordination apparatus 100 distributes the mismatch value at step S440. Thereafter, the protection device automatic coordination apparatus 100 generates a Jacobian value at step S445, obtains an inverse matrix of the Jacobian matrix at step S450, and calculates variations in voltage and phase angle at step S455. If the voltage of the bus converges on the reference value (Yes at step S460), the protection device automatic coordination apparatus 100 calculates flow injection between buses at step S465, and sets the direction of the flow at step S470.

The protection device automatic coordination apparatus 100 calculates the fault current of the distribution system based on the generated topology at step S500. That is, the protection device automatic coordination apparatus 100 calculates a fault current caused when a fault occurs in the distribution system, based on the topological information. In this case, the protection device automatic coordination apparatus 100 generates a fault current including at least one of a fault current caused by a 3-phase short-circuit, a fault current caused by a line-to-line short-circuit, a fault current caused by a double-line ground fault, and a fault current caused by a single line-ground fault. Here, the fault current calculation step will be described in greater detail below with reference to FIG. 11. The protection device automatic coordination apparatus 100 merges buses based on a zero impedance line or the closed state of a switch at step S510. After the protection device automatic coordination apparatus 100 separates valid buses at step S520, it generates a Y-matrix at step S530 and generates a Z-matrix. The protection device automatic coordination apparatus 100 calculates a fault current using the valid buses, the Y-matrix, and the Z-matrix. That is, the protection device automatic coordination apparatus 100 calculates a fault current for 3-phase short-circuit at step S540, and calculates a fault current for line-to-line short-circuit at step S550. The protection device automatic coordination apparatus 100 calculates a fault current for a double line-ground fault at step S560, and calculates a fault current for single line-ground fault at step S580.

The protection device automatic coordination apparatus 100 generates protection coordination correction values including the set communication target devices and the calculated system power flow and fault current at step S600. In this case, the protection device automatic coordination apparatus 100 generates protection coordination correction values including left and right communication target devices, the direction of a power flow, and a fault current, for each of the plurality of protection devices 60.

The protection device automatic coordination apparatus 100 corrects preset protection coordination information using the generated protection coordination correction values at step S700. That is, the protection device automatic coordination apparatus 100 corrects directional relay information using the system power flow of the protection coordination correction values, and corrects the respective minimum operating currents of the plurality of protection devices 60 using the fault currents of the protection coordinate correction values. In this case, when the main server 30 corrects the protection coordination information, step S700 may be omitted.

The protection device automatic coordination apparatus 100 transmits the protection coordination information corrected using the generated protection coordination correction values to the plurality of protection devices 60 via the main server 30 at step S800. In this case, if the main server 30 corrects the protection coordination information, the protection device automatic coordination apparatus 100 transmits the generated protection coordination correction values to the main server 30. The main server 30 corrects the protection coordination information using the received protection coordination correction values, and thereafter transmits the corrected protection coordination information to the plurality of protection devices 60.

As described above, an apparatus and method for automatically coordinating the protection devices of a smart power distribution management system are advantageous in that protection coordination correction values are generated based on topology generated using the distribution system status information of devices included in a distribution system, and protection coordination information is corrected, thus promptly coping with a distribution system management environment which is continuously changing, improving operation efficiency for the distribution system, and enabling a distribution system protection function to be desirably performed.

Further, the apparatus and method for automatically coordinating the protection devices of the smart power distribution management system are advantageous in that protection coordination information for the distribution system is corrected depending on a distribution system management environment which is continuously changing, thus preventing the distribution system from interrupting the supply of power and safely operating electric equipment.

Although embodiments of the present invention have been described, the present invention may be modified in various forms, and those skilled in the art will appreciate that various modifications and changes may be implemented without departing from the spirit and scope of the accompanying claims.

The invention claimed is:

1. An apparatus for automatically coordinating protection devices of a smart power distribution management system, the system including a plurality of measuring devices, a plurality of distributed power sources, a plurality of protection devices, a plurality of automatic switches, and a main server, comprising:
a processor including:
a status information acquisition unit for acquiring status information of a distribution system from the plurality of measuring devices;
a topology generation unit for generating topological information of the distribution system based on the acquired status information of the distribution system;
a communication setting unit for setting one or more communication target devices for transmitting/receiving data when an event occurs in the distribution system, for each of the plurality of protection devices based on the generated topological information;
a power flow calculation unit for calculating a system power flow including a power flow direction of the distribution system, based on the generated topological information;
a fault current calculation unit for calculating a fault current caused when a fault occurs in the distribution system, based on the generated topological information; and
a correction value generation unit for generating protection coordination correction values including the set communication target devices, the calculated system power flow, and the calculated fault current, for each of the plurality of protection devices,
wherein the communication setting unit separates the plurality of protection devices into corresponding areas based on the topological information, and sets left and right communication target devices for each of the plurality of protection devices.

2. The apparatus of claim 1, wherein the status information acquisition unit acquires status information of the distribution system, including system configuration and communication-executable device information of the distribution system.

3. The apparatus of claim 1, wherein the status information acquisition unit acquires communication-executable device information from pre-stored device information of the plurality of switches.

4. The apparatus of claim 1, wherein the power flow calculation unit sets a reference bus of the distribution system that is an analytic unit from the topological information, sets a power flow direction of the set reference bus to a single direction, and then calculates a system power flow.

5. The apparatus of claim 1, wherein the fault current calculation unit calculates a fault current including at least one of a fault current caused by a 3-phase short-circuit, a fault current caused by a line-to-line short-circuit, a fault current caused by a double line-ground fault, and a fault current caused by a single line-ground fault.

6. The apparatus of claim 1, wherein the correction value generation unit generates protection coordination correction values including left and right communication target devices, a power flow direction, and a fault current, for each of the plurality of protection devices.

7. The apparatus of claim 1, further comprising a control unit for performing control such that preset protection coordination information is corrected using the generated protection coordination correction values, and the corrected protection coordination information is transmitted to the plurality of protection devices through the main server.

8. The apparatus of claim 7, wherein the control unit corrects directional relay information using the system power flow, and corrects a minimum operating current of each of the plurality of protection devices using the fault current.

9. The apparatus of claim 1, further comprising a storage unit for storing protection coordination information of the distribution system, and storing device information including structures of the plurality of measuring devices, the plurality of distributed power sources, the plurality of protection devices, and the plurality of automatic switches.

10. A method for automatically coordinating protection devices of a smart power distribution management system, the system including a plurality of measuring devices, a plurality of distributed power sources, a plurality of protection devices, a plurality of automatic switches, and a main server, comprising:
acquiring status information of a distribution system from the plurality of measuring devices;
generating topological information of the distribution system based on the acquired status information of the distribution system;
setting one or more communication target devices for transmitting/receiving data when an event occurs in the distribution system, for each of the plurality of protection devices based on the generated topological information;
calculating a system power flow including a power flow direction of the distribution system, based on the generated topological information;
calculating a fault current caused when a fault occurs in the distribution system, based on the generated topological information; and
generating protection coordination correction values including the set communication target devices, the calculated system power flow, and the calculated fault current, for each of the plurality of protection devices, wherein setting the communication target devices comprises:
dividing the distribution system into a plurality of areas based on the topological information;
separating, based on the plurality of areas, the plurality of protection devices into corresponding areas; and
setting left and right communication target devices for each of the plurality of protection devices separated into the corresponding areas.

11. The method of claim 10, wherein acquiring the status information of the distribution system is configured to acquire status information of the distribution system, including system configuration and communication-executable device information of the distribution system.

12. The method of claim 10, wherein acquiring the status information of the distribution system is configured to acquire communication-executable device information from pre-stored device information of the plurality of switches.

13. The method of claim 10, wherein calculating the system power flow comprises:
setting a reference bus of the distribution system that is an analytic unit from the topological information; and
setting a power flow direction of the set reference bus to a single direction, and then calculating a system power flow.

14. The method of claim 10, wherein calculating the fault current is configured to calculate a fault current including at least one of a fault current caused by a 3-phase short-circuit, a fault current caused by a line-to-line short-circuit, a fault current caused by a double line-ground fault, and a fault current caused by a single line-ground fault.

15. The method of claim 10, wherein generating the protection coordination correction values is configured to generate protection coordination correction values including left and right communication target devices, a power flow direction, and a fault current, for each of the plurality of protection devices.

16. The method of claim 10, further comprising correcting preset protection coordination information using the generated protection coordination correction values.

17. The method of claim 16, wherein correcting the protection coordination information comprises:
correcting directional relay information using the calculated system power flow; and
correcting a minimum operating current of each of the plurality of protection devices using the calculated fault current.

18. The method of claim 10, further comprising transmitting protection coordination information corrected using the generated protection coordination correction values to the plurality of protection devices through the main server.

* * * * *